US009619110B2

(12) United States Patent
Breedvelt-Schouten

(10) Patent No.: US 9,619,110 B2
(45) Date of Patent: *Apr. 11, 2017

(54) ASSISTIVE OVERLAY FOR REPORT GENERATION

(71) Applicant: International Business Machines Corporation, Armonk, NY (US)

(72) Inventor: Ilse M. Breedvelt-Schouten, Manotick (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/226,757

(22) Filed: Mar. 26, 2014

(65) Prior Publication Data

US 2014/0215331 A1    Jul. 31, 2014

Related U.S. Application Data

(63) Continuation of application No. 13/752,172, filed on Jan. 28, 2013, now Pat. No. 9,372,596.

(51) Int. Cl.
*G06F 3/0482* (2013.01)
*G06F 3/0486* (2013.01)
(Continued)

(52) U.S. Cl.
CPC .......... *G06F 3/0482* (2013.01); *G06F 3/0486* (2013.01); *G06Q 10/06* (2013.01); *G06Q 10/10* (2013.01)

(58) Field of Classification Search
CPC ..... G06F 3/0486; G06F 3/0482; G06Q 10/06; G06Q 10/10
See application file for complete search history.

(56) References Cited

U.S. PATENT DOCUMENTS 5,742,286 A * 4/1998 Kung et al. ............... 715/839
5,999,178 A    12/1999 Hwang et al.
(Continued)

FOREIGN PATENT DOCUMENTS

CN    101339568 A    1/2009
CN    102841938 A    12/2012

OTHER PUBLICATIONS

Leonard, "An Exploratory Investigation of Handheld Computer Interaction for Older Adults with Visual Impairments," Assets '05 ACM, Oct. 2005, pp. 12-19.
(Continued)

*Primary Examiner* — Aaron Lowenberger
(74) *Attorney, Agent, or Firm* — Shumaker & Sieffert, P.A.

(57) ABSTRACT

In general, techniques are described for providing a user interface to create report specifications and included source definitions for business reporting and analysis. For example, a computing device includes a user interface (UI) module for displaying a graphical user interface (GUI) and receiving a selection of a data element at a start location of the GUI. The UI module may display an overlay element having a boundary forming a plurality of paths from the start location to a plurality of end locations, the paths corresponding to a plurality of report options associated with the data element. The UI module may receive a second input indicative of a traversal of the overlay element along a chosen path. The computing device may include a definition module operable to create a definition for a report specification based at least in part on the report option corresponding to the chosen path.

11 Claims, 8 Drawing Sheets

(51) Int. Cl.
G06Q 10/06 (2012.01)
G06Q 10/10 (2012.01)

(56) References Cited

U.S. PATENT DOCUMENTS

| | | | |
|---|---|---|---|
| 6,144,962 | A | 11/2000 | Weinberg et al. |
| 6,362,842 | B1 | 3/2002 | Tahara et al. |
| 7,324,983 | B1 | 1/2008 | Morris et al. |
| 7,752,566 | B1 | 7/2010 | Nelson |
| 7,925,658 | B2 | 4/2011 | Colaco et al. |
| 7,958,460 | B2 | 6/2011 | Garrison |
| 8,788,975 | B1 | 7/2014 | Griddaluru |
| 8,972,898 | B2 | 3/2015 | Carter |
| 2002/0013788 | A1* | 1/2002 | Pennell et al. .......... 707/507 |
| 2004/0095390 | A1 | 5/2004 | Arning et al. |
| 2006/0070007 | A1* | 3/2006 | Cummins et al. .......... 715/769 |
| 2006/0136833 | A1 | 6/2006 | Dettinger et al. |
| 2008/0077874 | A1* | 3/2008 | Garbow et al. .......... 715/764 |
| 2008/0172636 | A1 | 7/2008 | Danas |
| 2008/0215621 | A1* | 9/2008 | Ravindran et al. ........ 707/104.1 |
| 2008/0307357 | A1 | 12/2008 | Gould et al. |
| 2009/0113330 | A1* | 4/2009 | Garrison et al. .......... 715/769 |
| 2009/0125129 | A1 | 5/2009 | Eldridge et al. |
| 2009/0187842 | A1* | 7/2009 | Collins et al. .......... 715/769 |
| 2009/0276701 | A1* | 11/2009 | Nurmi .......... 715/702 |
| 2009/0279701 | A1 | 11/2009 | Moisand et al. |
| 2010/0153870 | A1 | 6/2010 | Hoffmann |
| 2011/0099497 | A1 | 4/2011 | Fok et al. |
| 2011/0202469 | A1 | 8/2011 | Venkateswaran et al. |
| 2011/0270833 | A1 | 11/2011 | von Kaenel et al. |
| 2011/0307817 | A1 | 12/2011 | Douceur et al. |
| 2012/0030566 | A1 | 2/2012 | Victor |
| 2012/0144325 | A1 | 6/2012 | Mital et al. |
| 2012/0162265 | A1 | 6/2012 | Heinrich et al. |
| 2012/0174041 | A1 | 7/2012 | Queru |
| 2012/0256863 | A1 | 10/2012 | Zhang et al. |
| 2012/0299933 | A1 | 11/2012 | Lau et al. |
| 2013/0024795 | A1 | 1/2013 | Robatham et al. |
| 2013/0042207 | A1 | 2/2013 | Matthews et al. |
| 2014/0040834 | A1* | 2/2014 | Thompson et al. .......... 715/856 |
| 2014/0047351 | A1 | 2/2014 | Cui et al. |
| 2014/0215405 | A1 | 7/2014 | Breedvelt-Schouten |
| 2014/0248948 | A1 | 9/2014 | Ho et al. |
| 2014/0282254 | A1 | 9/2014 | Feiereisen et al. |
| 2015/0248212 | A1 | 9/2015 | Breedvelt-Schouten et al. |

OTHER PUBLICATIONS

Beaudouin-Lafon, "Designing Interaction, not Interfaces," AVI'04, May 25, 2004; pp. 15-22.
Pausch, et al., "Lessons Learned from Suit, the Simple User Interface Toolkit," Computer Science Department, University of Virginia, Charlotesville, VA, ACM Transactions on Infromation System, vol. 10, No. 4, Oct. 1992, pp. 320-344.
Hudson, et al., "Extensible input Handling in the subArtic Toolkit," CHI 2005, Apr. 2, 2005, Portland, Oregon, pp. 381-390.
"Microsoft Windows User Experience," Oct. 8, 1999, Microsoft Press, Chapter 5, pp. 108.
Roth et al., "Bezel Swipe: Conflict-Free Scrolling and Multiple Selection on Mobile Touch Screen Devices," Apr. 4, 2009, ACM, in CHI 2009, Boston, MA.
Adobe Systems, Inc., Photoshop Help/ Selecting with the lasso tools, copyright 2015, updated Mar. 18, 2015, https://helpx.adobe.com/photoshop/using/selecting-lasso-tools.html.
Adobe Systems, Inc., Illustrator Help / Selecting objects, updated Oct. 20, 2014, https://helpx.adobe.com/illustrator/using/selecting-objects.html.
Office Action from U.S. Appl. No. 13/752,172, dated Jan. 7, 2015, 40 pp.
Shivde et al. "IBM Congos Proven Practices: Auto Cascading Prompts without Page Refresh in IBM Cognos Report Studio," IBM Corporation, Aug. 22, 2011, 11 pp.
Office Action from U.S. Appl. No. 13/752,172, dated Mar. 4, 2015, 40 pp.
Houghton Mifflin Company, Physical, Virtual definitions; 2011, The American Heritage Dictionary of the English language, Houghton Mifflin, Retrieved from <http://search.credoreference.com/content/entry/hmdictenglang/physical/0,/virtual/0,and/set_2/0> on Jan. 2, 2016; 8 pgs.
Non-Final Office Action from U.S. Appl. No. 14/193,602, mailed Jan. 13, 2016 29 pgs.
Notice of Allowance from U.S. Appl. No. 13/752,172, mailed Jan. 12, 2016 9 pgs.
Yang Li, "Gesture-Based Interaction: A New Dimension for Mobile User Interfaces," AVI'12, May 21-25, 2012, Capri Island, Italy, http://yangl.org/pdf/avi-2012-keynote.pdf (Abstract—1 page).
Report Studio Professional Authoring User Guide 8.4.0, http://publib.boulder.ibm.com/infocenter/c8bi/v8r4m0/index.isp?topic=/com.ibm.swg.im.cognos.ug_cr_rptstd.8.4.0.doc/ug_cr_rptstd_id10114rptstd_wrkdat_insert_members_from_t.html (last updated Nov. 27, 2009) (1 page).
U.S. Appl. No. 14/193,602, by Ilse M. Breedvelt-Schouten, Feb. 28, 2014.
Notice of Allowance from U.S. Appl. No. 13/752,172, dated Oct. 7, 2015, 2015, 17 pp.
Notice of Allowance from U.S. Appl. No. 13/752,172, mailed May 6, 2016.
Amendment in Response to Office Action mailed Jan. 13, 2016, from U.S. Appl. No. 14/193,602, filed Apr. 13, 2016, 16 pp.
Final Office Action from U.S. Appl. No. 14/193,602, mailed Aug. 12, 2016 17 pgs.
Response to Final Office Action mailed Aug. 12, 2016 from U.S. Appl. No. 14/193,602, filed Dec. 12, 2016 16 pgs.

* cited by examiner

ASSISTIVE OVERLAY FOR REPORT GENERATION

CROSS-REFERENCE TO RELATED APPLICATION

This application is a continuation of U.S. application Ser. No. 13/752,172 filed Jan. 28, 2013, the entire contents of which is hereby incorporated by reference.

FIELD OF INVENTION

The disclosure relates to report generation in computing systems.

BACKGROUND

Enterprise software systems are typically sophisticated, large-scale systems that support many, e.g., hundreds or thousands, of concurrent users. Examples of enterprise software systems include financial planning systems, budget planning systems, order management systems, inventory management systems, sales force management systems, business intelligence tools, enterprise reporting tools, project and resource management systems, and other enterprise software systems.

Many enterprise performance management and business planning applications require a large base of users to enter data that the software then accumulates into higher level areas of responsibility in the organization. Often these complex systems make use of multidimensional data sources that organize and manipulate the tremendous volume of data using data structures referred to as data cubes. A data cube may, for example, include a plurality of hierarchical dimensions having levels and members for storing the multidimensional data. Once data has been entered, a user may wish to view some or all of the data in a coherent manner by generating a report. The system may perform mathematical calculations on the data, combining data submitted by many users. Using the results of these calculations, the system may generate reports for review by higher management.

Reporting and analysis end user products (typically referred to as Business Intelligence, or BI, tools) allow users to author reports and perform data exploration and analysis on a myriad of data sources, such as multi-dimensional data structures, relational databases, flat files, Extensible Markup Language ("XML") data, data streams, and unorganized text and data. Business intelligence tools may be used to prepare and aggregate individual reports and analyses by executing queries on underlying data sources, and to present those reports and analyses in a user-accessible format. However, the underlying data sources are regularly changing over time and at different levels in the organization hierarchy. Users regularly desire to include such changes in a report, to perform up-to-date analysis. Business intelligence tools often require the user to create report specifications using complex query language or advanced functionality (e.g., selection modes) to define data sources to include when a report is generated.

SUMMARY

Techniques are described for providing a user with a clear and easy interface usable to create report specifications and included source definitions for business reporting and analysis. The techniques may, for example, provide an overlay element as part of a graphical user interface (GUI) that guides the user in selecting one or more report options associated with a data element. When a user makes a selection of a data element, the GUI may display an overlay element having paths traversable by the user. In some examples, the data element may be displayed in a source container of the GUI. In response to a traversal of one of the overlay element paths, the selected data element may incorporate or otherwise be modified by an attribute associated with the path. In some examples, the attributes are report options that can be applied to the data element.

The techniques may then create a report specification having definitions based on the selected report options. After the user has caused a traversal of one of the paths of the overlay element, the user may place the modified data element in specific locations to create a definition for a report specification. In some examples, the target containers may define portions of the report specification in which the definition is to be created.

In one example, the disclosure is directed to a computer-implemented method for providing an assistive overlay for report generation. The method may include receiving, from a user, a first input indicative of a selection of a data element defined within a data source, at a start location of a GUI. The method may include, responsive to receiving the selection, displaying an overlay element with the GUI, the overlay element having a boundary forming a plurality of paths from the start location to a plurality of end locations of the GUI, wherein the plurality of paths correspond to a plurality of report options associated with the data element. The method may also include receiving, from the user, a second input indicative of a traversal of the overlay element along a chosen path of the plurality of paths, from the start location to an end location for the chosen path and creating a definition for a report specification, based at least in part on the report option corresponding to the chosen path.

In another example the disclosure is directed to a computer-implemented method for providing an assistive overlay for report generation. The method may include receiving, from a user, a selection of a graphical representation of an object displayed at a start location by a graphical user interface (GUI) and, responsive to receiving the selection, displaying an overlay element by the GUI, the overlay element having a boundary forming a plurality of paths from the start location to a plurality of end locations, wherein the plurality of paths correspond to a plurality of selectable attributes associated with the object. The method may also include receiving, from the user, input dragging the selected representation along a chosen path of the plurality of paths, from the start location to an end location for the chosen path and modifying the representation to incorporate the selectable attribute associated with the chosen path.

In one example the disclosure is directed to a computing system for providing an assistive overlay for report generation. The computing system may include one or more processors and one or more memories. The computing system may also include one or more input devices, one or more output devices, and a user interface module, operable by the one or more processors to display at the one or more output devices a GUI, the GUI including at least one representation of a data element defined within a data source. The user interface module may also be operable to receive, from a user via the one or more input devices, a first input indicative of a selection of the at least one representation, at a start location of the GUI and, responsive to receiving the selection, display an overlay element with the GUI, the overlay element having a boundary forming a plurality of paths from the start location to a plurality of end locations of the GUI, wherein the plurality of paths correspond to a plurality of report options associated with the data element. The user interface module may also be operable to receive, from the user via the one or more input devices, a second input indicative of a traversal of the overlay element along a chosen path of the plurality of paths, from the start location to an end location for the chosen path. The computing device may also include a definition module operable by the one or more processors to create a definition for a report specification, based at least in part on the report option corresponding to the chosen path.

In one example the disclosure is directed to a computer program product for providing an assistive overlay for report generation. The computer program product may include a computer-readable storage medium having program code embodied therewith, the program code executable by a computing device to perform a method comprising receiving, by the computing device and from a user, a first input indicative of a selection of a data element defined within a data source, at a start location within a GUI, and responsive to receiving the selection, displaying, by the computing device, an overlay element as part of the GUI, the overlay element having a boundary forming a plurality of paths from the start location to a plurality of end locations within the GUI, wherein the plurality of paths correspond to a plurality of report options associated with the data element. The method may further comprise receiving, by the computing device and from the user, a second input indicative of a traversal of the overlay element along a chosen path of the plurality of paths, from the start location to an end location for the chosen path and creating, by the computing device, a definition for a report specification, based at least in part on the report option corresponding to the chosen path.

The details of one or more aspects of this disclosure are set forth in the accompanying drawings and the description below. Other features, objects, and advantages of the disclosure will be apparent from the description and drawings, and from the claims.

DETAILED DESCRIPTION

Figure 1:
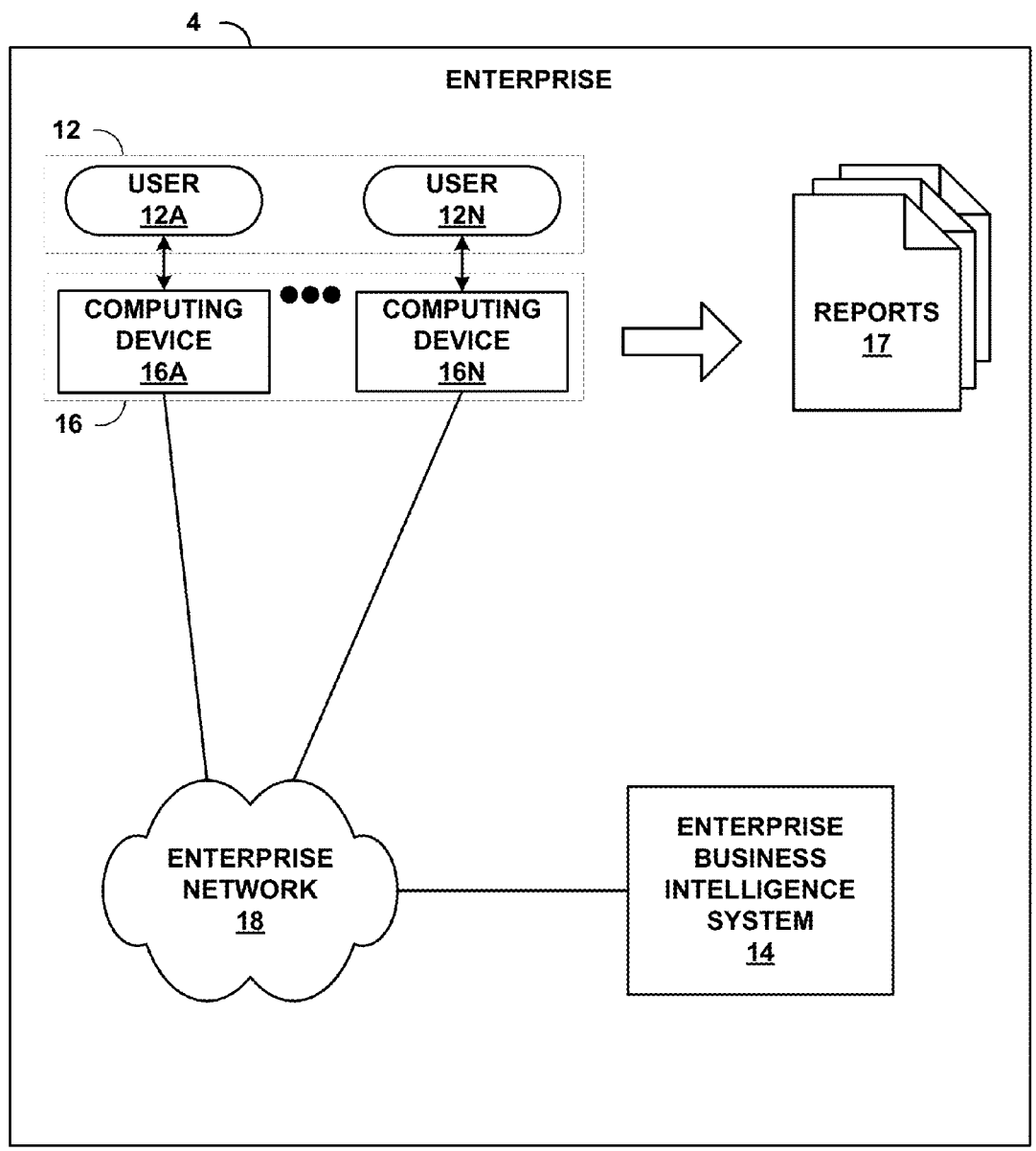
FIG. 1 is a block diagram illustrating an example computing environment in which a plurality of users interact with an enterprise business intelligence system, in accordance with one or more aspects of the present disclosure.

FIG. 1 illustrates an example context in which techniques disclosed herein may be used. FIG. 1 is a block diagram illustrating an example enterprise 4 in which a plurality of users 12A-12N (collectively "users 12") may interact with an enterprise business intelligence system 14, in accordance with one or more aspects of the present disclosure. As shown in the example system of FIG. 1, enterprise business intelligence system 14 may be communicatively coupled to a number of computing devices 16A-16N (collectively "computing devices 16") by an enterprise network 18. Users 12 interact with their respective computing devices to access enterprise business intelligence system 14 and input, modify, and review data. In one example, users 12 may use computing devices 16 to access enterprise business intelligence system 14 and author one or more reports 17. Reports 17 may include business intelligence reports, such as sales reports, revenue reports, payroll reports, etc. Enterprise business intelligence system 14 may provide users 12 with functionality to create or define a structure for reports 17 using report specifications. Users 12, computing devices 16A-16N, enterprise network 18, and enterprise business intelligence system 14 may all be either in a single facility or widely dispersed in two or more separate locations anywhere in the world, in different examples.

For exemplary purposes, various examples of the techniques of this disclosure may be readily applied to various software systems executed by various devices, including enterprise business intelligence systems, other large-scale enterprise software systems, as well as single-user, stand-alone software applications. Examples of enterprise software systems include enterprise financial or budget planning systems, order management systems, inventory management systems, sales force management systems, business intelligence tools, enterprise reporting tools, project and resource management systems, and other enterprise software systems. Other example applications include graphical design applications, email applications or any environment where fine-grained user interaction and/or selection among a plurality of potential object attributes may be used. For instance, techniques of this disclosure may be readily applied by user interfaces for populating one or more fields of a form or other document structure. That is, an assistive overlay may allow a user to define one or more aspects of an object before placing it in to a field an interactive form, such as an address field of a form to create a greeting card or a payment-type field of an e-commerce checkout form.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

In the example of FIG. 1, typically, users 12 may use a user-configurable business intelligence user interface (UI) to view and manipulate data (e.g., generate reports 17) via their respective computing devices 16. This may include data from any of a wide variety of sources, including from multidimensional data structures and relational databases within enterprise 4, as well as data from a variety of external sources that may be accessible over a public network. Multidimensional data structures are "multidimensional" in that each multidimensional data element is defined by a plurality of different object types, where each object is associated with a different dimension. Users 12 may, for example, retrieve data related to store sales by entering a name of a sales person, a store identifier, a date, a product, and a price at which the product was sold, into their respective computing devices 16.

Enterprise users 12 may use a variety of different types of computing devices 16 to run a business intelligence UI and to generate business intelligence reports 17 or otherwise interact with enterprise business intelligence system 14 via enterprise network 18. For example, an enterprise user 12 may run a business intelligence UI and interact with enterprise business intelligence system 14 using a laptop computer, desktop computer, or the like, running a web browser, such as Internet Explorer™ from Microsoft Corporation of Redmond, Wash. Alternatively, an enterprise user may use a smartphone or similar device, running a business intelligence UI in either a web browser or a dedicated mobile application for interacting with enterprise business intelligence system 14. Further examples of computing devices 16 may include workstation computers, netbooks, tablet computers, E-readers, or any other such computing device. In either case, a business intelligence UI running on a user's computing device 16 may access various data sources from within enterprise business intelligence system 14, as well as any of a variety of external network resources and any of a variety of external data sources.

Enterprise network 18 may represent any communication network, such as a packet-based digital network like a private enterprise intranet or a public network like the Internet. In this manner, enterprise network 18 can readily scale to suit large enterprises. Enterprise users 12 may directly access enterprise business intelligence system 14 via a local area network, or may remotely access enterprise business intelligence system 14 via a virtual private network, remote dial-up, or similar remote access communication mechanism.

The business intelligence UI running on a user's computing device 16 may use retrieved data to generate one or more reports 17. Reports 17 may include any visual representation or depiction of data such as tables, charts, graphs, or other methods of disseminating information. For example, reports 17 may include a graph with sales values assigned to a vertical axis, and time values assigned to a horizontal axis, a chart of revenue values recorded for various sales regions, a table of payroll data values recorded for different enterprise locations, a graph of enterprise spending by department, etc. Users 12 may interact with computing devices 16 to generate one or more reports 17 by selecting different elements and/or dimensions to display in reports 17. Various data elements or dimensions of enterprise data may be organized in a hierarchy, divisible into sub-elements or having other selectable attributes. Examples of hierarchical data elements include sales zones of the world, business regions and locations within an enterprise, etc. Examples of sub-elements may include more specific areas or locations, separation into various value ranges, static or dynamic reporting, etc. In some examples, these sub-elements or other selectable attributes may optionally be defined in report specifications by report options. Generally, report options may determine the type, layout, quantity, categories, or other characteristics of data elements for reports 17. Report options may also define the particular data elements or range of data elements to include in reports 17. In other examples, report options may include any modifiable characteristic of a selectable data element or dimension. Users 12 may cause computing devices 16 to create report specifications having one or more definitions based on local data stored on computing devices 16 and/or data obtained via enterprise network 18. Report specifications may be used in generating reports 17.

Techniques of the present disclosure may improve user efficiency in report generation and other areas in which fine-grained user interaction (e.g., form completion, graphical design, or email applications) may be used by providing a UI having an overlay element to select report options of various data elements and create definitions for report specifications. For example, the UI may provide an overlay element to choose a report option associated with a data element. The overlay element may include a plurality of paths, traversable by the user, to define a report option. By providing an overlay element with traversable paths, the computing device may allow a user to define data elements to be included in a report with simple motions. That is, computing device 16A may reduce the amount of input (e.g., clicks and/or motion) required to choose a report option and create a definition for a report specification.

Figure 2:
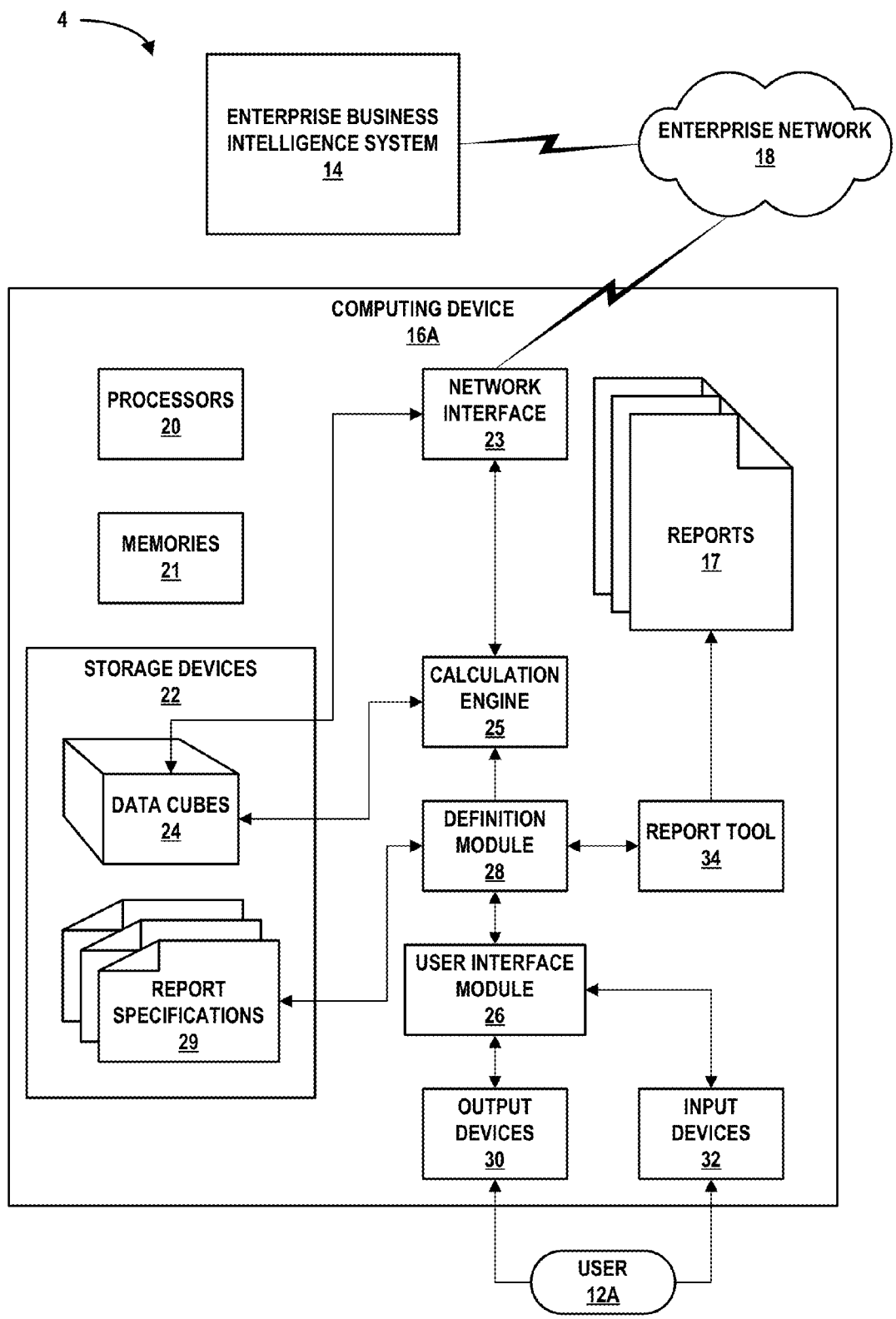
FIG. 2 is a block diagram illustrating one example of a computing device for interacting with the enterprise business intelligence system of FIG. 1, in accordance with one or more aspects of the present disclosure.

FIG. 2 is a block diagram illustrating one example of a computing device 16A for interacting with the enterprise business intelligence system 14 of FIG. 1, in accordance with one or more aspects of the present disclosure. Computing device 16A includes one or more processors 20, one or more memories 21, and one or more storage devices 22. In addition, computing device 16A includes network interface 23, calculation engine 25, user interface (UI) module 26, definition module 28, one or more output devices 30, one or more input devices 32 and report tool 34. Storage devices 22 may contain data cubes 24 and report specifications 29, as shown in FIG. 2. In other examples, storage devices 22 may contain other components of computing device 16A.

Processors 20, in one example, are configured to implement functionality and/or process instructions for execution within computing device 16A. For example, processors 20 may be capable of executing instructions of various components of computing device 16A, such as calculation engine 25. Examples of processors 20 may include, any one or more of a microprocessor, a controller, a digital signal processor (DSP), an application specific integrated circuit (ASIC), a field-programmable gate array (FPGA), or equivalent discrete or integrated logic circuitry.

One or more memories 21 may be configured to store information within computing device 16A during operation. Memories 21, in some examples, are a temporary memory, meaning that a primary purpose of memories 21 is not long-term storage. Memories 21, in some examples, are described as volatile memory, meaning that memories 21 do not maintain stored contents when the computer is turned off. Examples of volatile memories include random access memories (RAM), dynamic random access memories (DRAM), static random access memories (SRAM), and other forms of volatile memories known in the art. In some examples, memories 21 are used to store program instructions for execution by processors 20. Memories 21, in one example, are used by software or applications running on computing device 16A (e.g., calculation engine 25, modules 26 and 28, or report tool 34) to temporarily store information during program execution.

Storage devices 22, in some examples, include one or more computer-readable storage media. Storage devices 22 may be configured to store larger amounts of information than volatile memory. Storage devices 22 may further be configured for long-term storage of information. In some examples, storage devices 22 include non-volatile storage elements. Examples of such non-volatile storage elements include magnetic hard discs, optical discs, floppy discs, flash memories, or forms of electrically programmable memories (EPROM) or electrically erasable and programmable memories (EEPROM). In the example of FIG. 2, storage devices 22 may store data cubes 24 and report specifications 29 for use during operation of computing device 16A.

Computing device 16A, in some examples, includes network interface 23. Network interface may provide functionality to communicate with external devices, such as enterprise business intelligence system 14, via one or more networks (e.g., enterprise network 18). Network interface 23 may include a network interface card, such as an Ethernet card, an optical transceiver, a radio frequency transceiver, or any other type of device that can send and receive information. Other examples of such network interfaces may include 3G and WiFi radio components, as well as Universal Serial Bus (USB). In some examples, computing device 16A utilizes network interface 23 to communicate with enterprise business intelligence system 14 when sending or receiving multidimensional data, such as when retrieving data for reports 17.

In the example of FIG. 2, computing device 16A may include one or more data cubes 24 within storage devices 22. Data cubes 24 may store data from user 12A and/or from data sources of enterprise business intelligence system 14 via enterprise network 18. Data stored in data cubes 24 may provide the underlying data for computing device 16A to define report specifications 29 and/or create reports 17. Data cubes 24 may include two-dimensional databases and/or multidimensional databases, i.e. cubes. Data cubes 24 may be implemented using a variety of vendor platforms, and may be distributed throughout the enterprise via network interface 23. As one example, data cubes 24 may be multidimensional databases configured for Online Analytical Processing (OLAP). As another example, data cubes 24 may be multidimensional databases configured to receive and execute Multidimensional Expression (MDX) queries of some arbitrary level of complexity. As yet another example, data cubes 24 may be two-dimensional relational databases configured to receive and execute SQL queries, also with an arbitrary level of complexity. Storing data cubes 24 locally within storage devices 22 may allow some or all calculation required in defining report specifications 29 and generating reports 17 to be performed locally by computing device 16A. In other examples, computing device 16A may not store data cubes 24 locally, and one or more devices, such as enterprise business intelligence system 14 may perform the required calculation.

Computing device 16A, in some examples, includes calculation engine 25. Calculation engine 25 may include instructions operable by processors 20 via memories 21 to receive report specifications and perform calculations to generate reports 17. For example, calculation engine 25 may receive a request from definition module 28 to determine one or more calculations regarding specific data within multidimensional data of enterprise 4. In other examples, calculation engine 25 may receive a request to aggregate or sum data of a particular dimension, or a request to determine current values of items within a dimension. Calculation engine 25 may retrieve relevant enterprise data from data cubes 24 and/or enterprise business intelligence system 14 via network interface 23 and perform the requested calculations. The results of calculations performed by calculation engine 25 may be sent to other components associated with computing device 16A, such as definition module 28 or report tool 34.

As shown in the example of FIG. 2, computing device 16A may include definition module 28. Definition module 28 may include instructions operable by processors 20 via memories 21 to receive input from UI module 26, and create definitions for one or more report specifications 29 based on the received input. Report specifications 29 may be one or more documents stored on storage devices 22 that provide the structure and required content of reports 17. In some examples, report specifications 29 may consist of documents or files containing markup language (e.g., XML) instructions defining various requirements for a report. For instance, a report specification may define the layout of various charts and tables to be displayed in a report. Report specifications 29 may include one or more definitions specifying which data element or elements are to be included in parts of reports 17. The definitions within report specifications 29 may be created in a query language, (e.g., SQL), and may be executable by components of computing device 16A to cause retrieval of the defined data elements from underlying data sources. As one example, a definition may cause a report to include all data elements belonging to a particular hierarchy.

Definition module 28 may receive requests from report tool 34 to provide the data for a specific one of reports 17. Definition module 28 may include instructions operable by processors 20 via memories 21 to use the definitions of report specifications 29 to query calculation engine 25 for the required data. That is, definition module 28 may receive input to generate a report, create one or more definitions within report specifications 29, output queries based on the definitions to obtain the requisite data (e.g., from data cubes 24), and provide the retrieved data to report tool 34.

Computing device 16A, in some examples, may include report tool 34. Report tool 34 may include instructions operable by processors 20 via memories 21 to receive data from definition module 28 corresponding to report specifications 29. Report tool 34 may generate one or more reports 17 based on the received data. In the example of FIG. 2, report tool 34 outputs reports 17 locally at computing device 16A. In other examples, report tool 34 may output reports 17 to enterprise business intelligence system 14, or to others of computing devices 16 via network interface 23.

As shown in the example of FIG. 2, computing device 16A may include UI module 26. UI module 26 may include instructions operable by processors 20 via memories 21 to interact with output devices 20 and/or input devices 32 to provide an interface to user 12A enabling selection of various data elements from the multidimensional enterprise data and/or creation of one or more reports 17. That is, UI module 26 may display a GUI (e.g., at one or more of output devices 30) with which user 12A can interact (e.g., by using one or more of input devices 32) to cause computing device 16A to create definitions for report specifications 29 and/or generate reports 17 based on report specifications 29.

UI module 26 may output information to user 12A via one or more of output devices 30 operatively coupled to computing device 16A. Output devices 30, in some examples, are configured to provide output to a user using tactile, audio, or video stimuli. Output devices 30 may include a presence-sensitive display, a sound card, a video graphics adapter card, or any other type of device for converting a signal into an appropriate form understandable to humans or machines. Additional examples of output devices 30 include a speaker, a cathode ray tube (CRT) monitor, a liquid crystal display (LCD), or any other type of device that can generate intelligible output to a user. UI module 26 may receive input from user 12A via one or more input devices 32. Input devices 32 may be part of computing device 16A, or may be communicatively coupled to computing device 16A. Input devices 32 may include a keyboard, a mouse, a touch-sensitive or presence-sensitive display, a stylus, or any device operable to provide machine input.

In accordance with one or more aspects of the present disclosure, UI module 26 may provide user 12A with a way of creating definitions for report specifications 29 by displaying an overlay element at output devices 30 to guide user 12A through the selection of one or more sub-elements or report options associated with a data element. For example, UI module 26 may display a report generation UI at output devices 30, having a source container and one or more target containers associated with the report to be generated. The source container may be user-selectable and may display data elements which the user desires to include in the particular report. For instance, a source container selected for a revenue report may contain various revenue groups such as geographical regions or product categories or other methods of breaking down revenues. The target container or containers may define the structure and/or layout of the revenue report.

UI module 26 may receive an indication of user 12A's selection of a data element for inclusion in a report from input devices 32. In response to receiving the indication, UI module 26 may display as part of the UI an overlay element having a tree-like structure. The "trunk" of the overlay element may be located at or near user 12A's selection of the data element. A "branch" of the overlay element may be associated with a report option of the data element. In this way, UI module 26 may create paths from the selected data element to the one or more report options. When UI module 26 receives input from input devices 32 indicative of a traversal of a path, the selected object may be modified to incorporate the associated report option.

UI module 26 may receive, from input devices 32, a placement of the modified object in a target container. In response to receiving the placement, UI module 26 may cause definition module 28 to create a definition within a report specification based on the modified data element. Responsive to subsequent input, such as a request to generate the report, definition module 28 may cause calculation engine 25 to retrieve data based on the created definition. Definition module 28 may provide the retrieved data to report tool 34 for generation of reports 17. In this way, UI module 26 may allow user 12A to create definitions for a report specification by moving an input unit (e.g., a finger, a mouse cursor, a stylus, etc.) along a path from a start point associated with the initially selected data element to an end point associated with a report option of the data element. That is, techniques of the present disclosure may provide an intuitive user interface for causing a computing device to create definitions for report specifications, based on user input. UI module 26 is further described with respect to the specific examples of FIGS. 3A, 3B, 4A, 4B, 5, and 6 below.

Figure 3A:
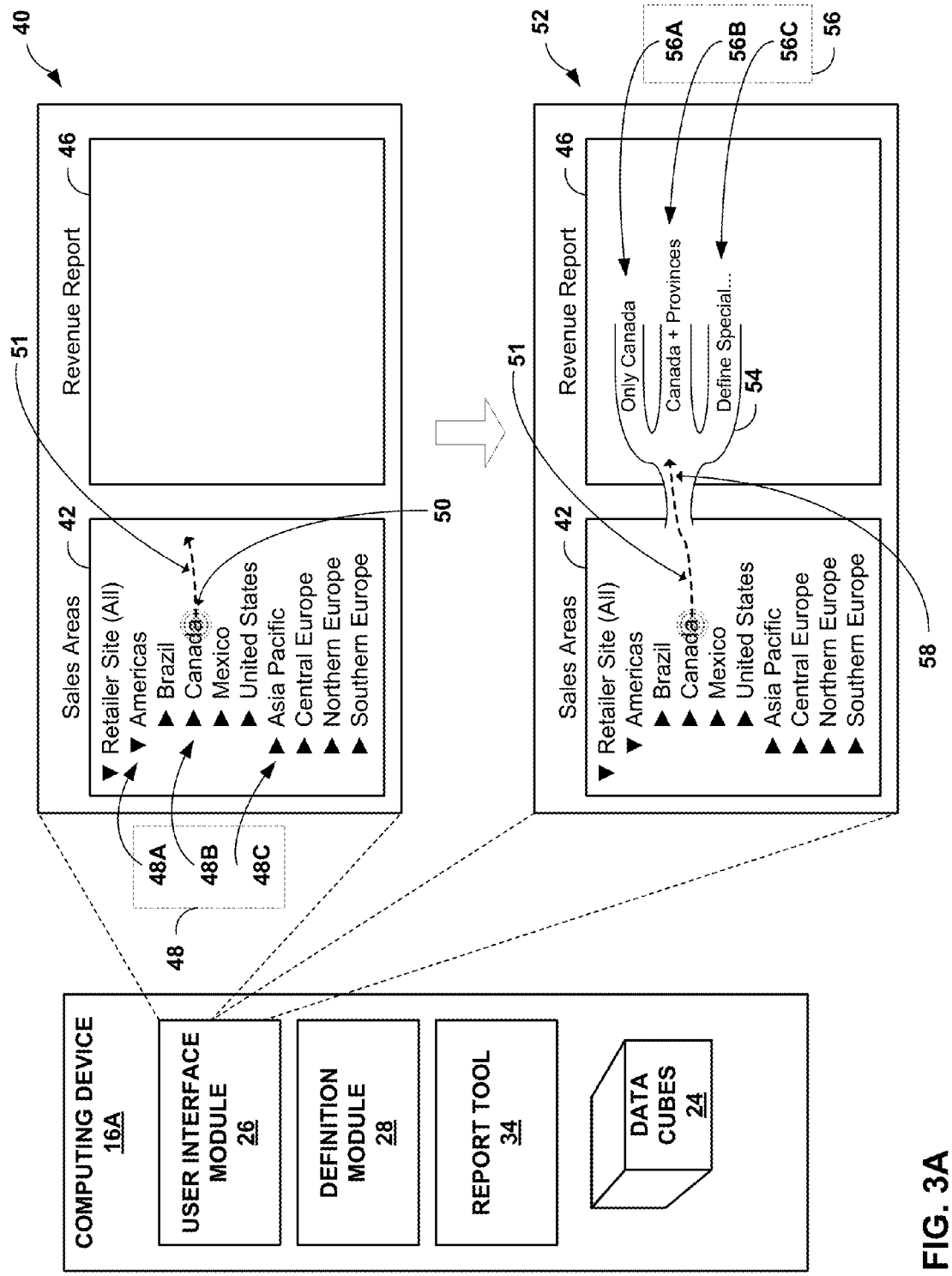
FIGS. 3A and 3B are block diagrams illustrating an example computing device and GUIs for providing fine-grained user interaction, in accordance with one or more aspects of the present disclosure.
Figure 3B:
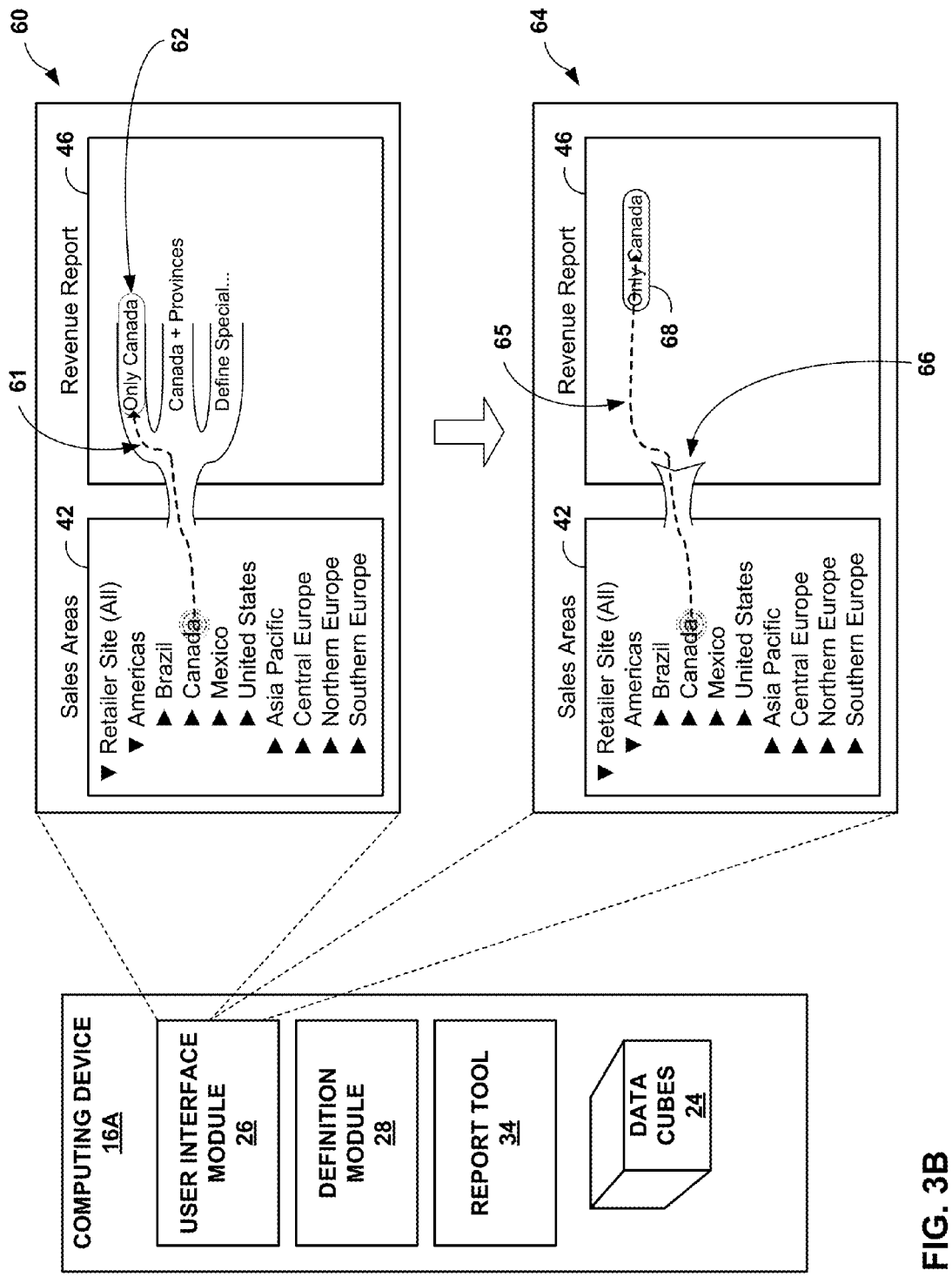

FIGS. 3A and 3B are block diagrams illustrating an example computing device and GUIs for providing fine-grained user interaction, in accordance with one or more aspects of the present disclosure. For purposes of illustration only, the example shown in FIGS. 3A and 3B is described in the context of computing device 16A and enterprise business intelligence system 14 as shown in FIGS. 1 and 2. While described in the context of a report generation UI of an enterprise business intelligence system, techniques of the present disclosure may be readily applied to various other areas to provide fine-grained user interaction. As shown in FIGS. 3A and 3B, computing device 16A includes components, such as UI module 26, definition module 28, report tool 34, and data cubes 24. Components of computing device 16A can include functionality similar to the functionality of such components as described in FIGS. 1 and 2.

In some example techniques, UI module 26 may output for display a graphical overlay element when a data element is selected. For instance, UI module 26 may cause an overlay element having a tree structure to be output for display over the report generation UI, with the trunk at or near a user's selection of the data element and with one or more report options of the data element branching off from the trunk in the direction of one or more target containers. UI module 26 may, upon receiving input indicating a traversal of the overlay element, incorporate the report option and cease to display the overlay element or collapse the element. Such techniques are further illustrated in FIGS. 3A and 3B.

As shown in FIG. 3A, UI module 26 may display GUI 40. In some examples, UI module 26 may display GUI 40 on an output device, such as an LCD, and UI module 26 may receive input via electromechanical input units, such as a computer mouse or stylus pen. In other examples, GUI 40 may be output for display at a presence-sensitive display such as a touch screen, and UI module 26 may receive touch inputs (e.g., from a user's finger). GUI 40 may be a UI for generating revenue reports from enterprise data of enterprise business intelligence system 14. GUI 40 may include a single source container 42 and a single target container 46. In the example of FIG. 3A, the enterprise may have a number of sales areas such as the Americas (i.e., area data element 48A) and Asia Pacific (i.e., area data element 48C). Some area data elements may be hierarchical and include sub-elements, such as area data element 48A which has the sub-element Canada (i.e., area data element 48B). Area data elements 48A, 48B, and 48C (collectively "area data elements 48") may each be a representation of data contained in enterprise business intelligence system 14. That is, area data elements 48 may each be associated with one or more data sources within the multidimensional data of enterprise business intelligence system 14. In some examples, the relevant data sources may be stored locally in data cubes 24. In other examples, computing device 16A may use network interface 23 to access data cubes stored elsewhere.

One or more of area data elements 48 may include a number of sub-elements. For instance, area data element 48B may refer to sales data for Canada, but may include sales data for individual provinces in Canada. In turn, each area data element for a Canadian province may include sales data elements for individual counties, municipal districts, or territorial districts. A user (e.g., user 12A) may desire to create a report specification including sales data for Canada in the revenue report. Consequently, user interface module 26 may receive input 50 indicating a selection of area data element 48B. Input 50 may, for instance, be a click-and-hold selection received via a computer mouse, or a touch-and-hold selection received via a touch screen.

In some examples, if UI module 26 subsequently receives input releasing the selection (e.g., from user 12A releasing the mouse button or removing a finger from the touch screen), UI module 26 may do nothing, or perform other actions unrelated to the present disclosure. If, however, UI module 26 receives an indication of sliding input 51 moving to the right, subsequent to receiving an indication of input 50, UI module 26 may display overlay element 54. In other examples, input 50 may correspond to a single click of the mouse button or a tap gesture received via the touch screen, and subsequent input (e.g., sliding input 51) may not require a continuing selection of area data element 48B. In some examples, sliding input 51 may be a movement to the left, upward, or downward, such as when target container 46 is located in a different location with respect to source container 42. In other words, UI module 26 may display overlay element 54 when user 12A selects area data element 48B and drags the selection from source container 42 toward target container 46.

UI module 26 may display overlay element 54 as shown in GUI 52. Overlay element 54 may be a graphical object displayed overlying the report generation GUI. In some examples, overlay element 54 may have a graphical boundary as shown in FIG. 3A. In other examples, overlay element 54 may be differentiated from the rest of GUI 52 in some other manner. Overlay element 54 may, for instance, be output for display in a different color, a different pattern, or a different hue when compared to the rest of GUI 52. In various examples, overlay element 54 may be opaque, semi-transparent, or completely transparent. Overlay element 54 may provide one or more paths from a current selection of an area data element to one or more end points. End points may correspond to selectable characteristics of area data element 48B, such as a report option. In some examples, the input unit of user 12A (e.g., the mouse cursor) may be restricted to allow movement only within the boundary of overlay element 54 such that the input unit cannot leave the confines of overlay element 54 except through the displayed outlets (e.g., to the left and right of overlay element 54). In other examples, movement past the boundary of overlay element 54 may result in UI module 26 ceasing to display overlay element 54.

In the example of GUI 52, overlay element 54 depicts three paths: path 56A, path 56B, and path 56C (collectively "paths 56"). Paths 56 may be associated with report options of area data element 48B, each option specifying the data source or sources to be included in a report. Path 56A, labeled "Only Canada," may be associated with a normal or default report option, the option defining area data element 48B as only revenue data for Canada as a whole. Path 56B, labeled "Canada+Provinces," may be associated with a report option defining area data element 48B as including provincial area data sources as well as the area data of Canada as a whole. Path 56C, labeled "Define Special . . . ," may be a special path, providing user 12A with the option to create a custom report option for defining area data element 48B. In other words, the paths may redefine area data element 48B such that when user 12A traverses a path of overlay element 54 with an input unit (e.g., a finger or mouse cursor), the resulting area data element may have characteristics different than the originally selected area data element 48B. User 12A may, in one example, desire to create a report specification including a definition specifying the inclusion of revenue data of only Canada. Consequently, UI module 26 may receive input indicating a traversal of the mouse cursor to the right (e.g., input 58).

In response to receiving an indication of input corresponding to the mouse cursor nearing the end of a path, UI module 26 may output an indication to user 12A of the selected report option. In other examples, UI module 26 may not output any indication.

Referring to FIG. 3B, UI module 26 may display GUI 60 having source container 42 and target container 46. UI module 26 may receive an indication of input 61 traversing path 56A as shown in the example of GUI 60. In response to receiving the indication of input 61, UI module 26 may output the corresponding label 62 in a highlighted manner. That is, UI module 26 may indicate that completing a traversal of path 56A will result in a selection of the "Only Canada" report option. In this manner, UI module 26 may prevent user 12A from erroneously selecting a report option.

UI module 26 may receive an indication of further input 65, completing path 56A. Once an indication of input 65 is received such that the input unit (e.g., mouse cursor, user 12A's finger, etc.) has completed the traversal of a path, UI module 26 may enter an insertion mode as shown in GUI 64. UI module 26 may change the display of overlay element 54. In some examples, UI module 26 may cease to display overlay element 54. In other examples, UI module 26 may display overlay stem 66, a small portion of overlay element 54, as shown in GUI 64. Stem 66 may provide user 12A with a reversion area. That is, if UI module 26 receives an indication of input corresponding to user 12A dragging a modified data element to the location bounded by stem 66, UI module 26 may remove the previously incorporated report option and revert the selection to its previous state.

Upon receiving an indication of input 65 and a complete traversal of path 56A, UI module 26 may modify the selected area data element 48B to incorporate the report option associated with path 56A. For example, the selection of area data element 48B, "Canada," may, after traversing path 56A by input 65, result in a selection of modified area data element 68, "Only Canada," as shown in GUI 64. After UI module 26 enters insertion mode, modified area data element 68 may then be placed by user 12A in a target container, such as target container 46.

In some examples, user 12A may have caused area data element 48B to traverse path 56A unintentionally. After the traversal has been completed, and UI module 26 enters insertion mode, user 12A may desire to change his or her selection or otherwise undo the modification. In this instance, stem 66 may be used by user 12A to do so.

If, however, user 12A is satisfied with modified area data element 68, modified area data element 68 may be placed in a target container (e.g., target container 46). Upon receiving an indication of input corresponding to a placement of a data element in a target container, UI module 26 may send data to definition module 28 indicating the data element and the target container. In response to receiving data from UI module 26, definition module 28 may create one or more definitions for report specifications 29 specifying data sources based on the data element as modified by the report option (e.g., modified area data element 68). In this manner, UI module 26 may provide a way for users to choose data elements having various selectable report options within enterprise business intelligence system 14 and create definitions for report specifications based on those data elements. Techniques of the present disclosure allow users to specify a report option of a desired data element with a single gesture and create definitions for report specifications based on the data element or elements selected.

Figure 4A:
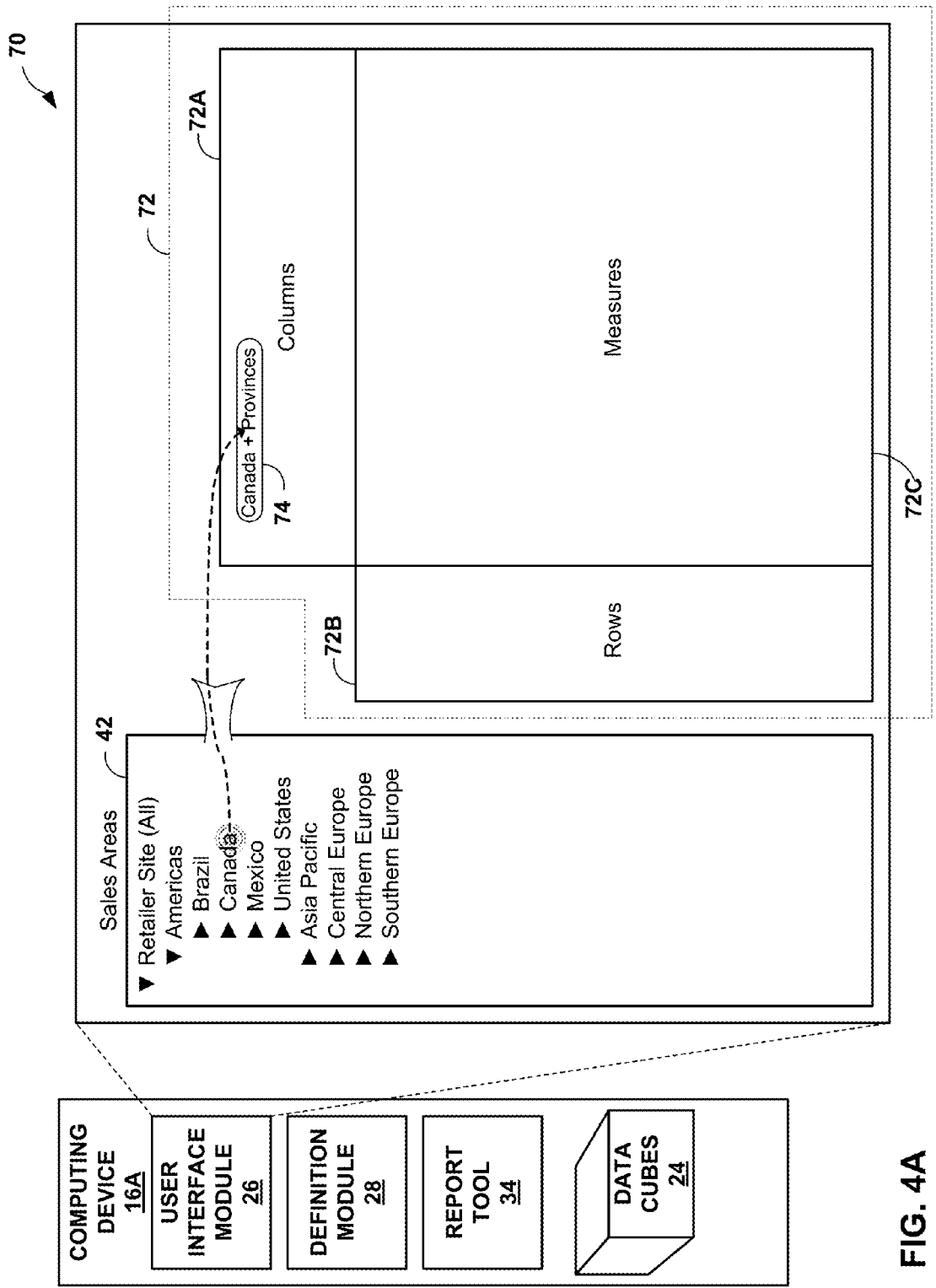
FIGS. 4A and 4B are block diagrams illustrating example GUIs for providing fine-grained user interaction, in accordance with one or more aspects of the present disclosure.
Figure 4B:
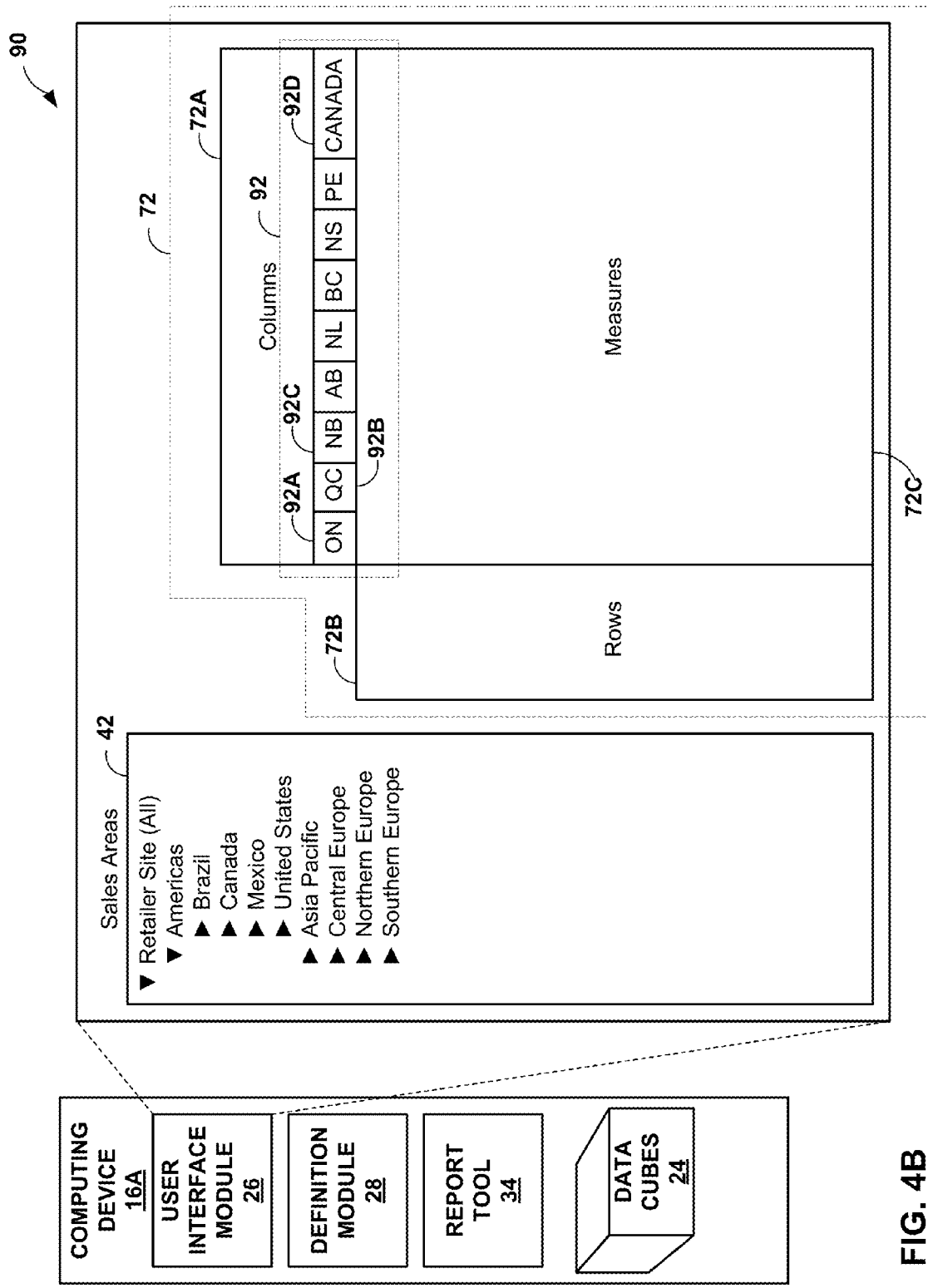

FIGS. 4A and 4B are block diagrams illustrating example GUIs for providing fine-grained user interaction, in accordance with one or more aspects of the present disclosure. For purposes of illustration only, the example of FIGS. 4A and 4B is described below within the context of computing device 16A, as shown in FIGS. 1 and 2. GUIs 70 and 90 of FIGS. 4A and 4B, respectively, may be output for display by, for example, computing device 16A.

In some examples, techniques of the present disclosure may enable user 12A to place data elements incorporating one or more report options in different target containers within a report structure to create definitions in report specifications corresponding to report areas. For instance, user 12A may have selected a report option for a data element as described with respect to FIGS. 3A and 3B above. UI module 26 may output for display a number of target containers able to receive the modified data element. In response to receiving a placement from user 12A of the modified data element in one of the target containers, UI module 26 may modify the displayed target containers to reflect the current partial structure of the report specification to be generated. In other examples, techniques of the present disclosure may enable a user to select attributes of a contact within an email application, select graphical elements to include in a graphical design, select items to populate a form, or perform other tasks including selection of an element having various selectable attributes.

In the example of FIG. 4A, GUI 70 may display a UI for generating revenue reports. GUI 70 may include a source container 42 and target containers 72A, 72B, and 72C (collectively "target containers 72"). In accordance with techniques of the present disclosure, user 12A may have selected a revenue data element from source container 42, and traversed a displayed overlay element to modify the selected element with a selected report option. For example, user 12A may desire to include revenue data for provinces of Canada, as well as revenue data for Canada as a whole, in a revenue report. Consequently, user 12A may have selected the "Canada" revenue data element, and traversed a path associated with a "Canada+Provinces" report option in order to transform his or her selection into modified area data element 74.

Once a user is satisfied with his or her selection of a data element having a chosen report option, the user may place the modified data element in a target container. In the example of FIG. 4A, user 12A may desire to create a definition, within a report specification, for a revenue report in which data sources for Canada as a whole and each Canadian province are displayed in separate columns (e.g., in a spreadsheet). Consequently, UI module 26 may receive an indication of input corresponding to a placement of modified area data element 74 in target container 72A. Responsive to receiving the input, UI module 26 may send data to definition module 28 including an indication of modified area data element 74 and target container 72A.

Definition module 28 may receive the data from UI module 26, and define or modify a definition of a report specification based on the received data. For instance, definition module 28 may generate one or more queries in an appropriate location of the report specification that, when executed, locate and retrieve the specified data from the relevant data sources, such as data cubes 24. In some examples, definition module 28 may send one or more queries to calculation engine 25 to determine what data elements should be included in the report specification definition. Responsive to receiving information from calculation engine 25, definition module 28 may create a definition for a report specification that includes the identified data elements. For instance, the report option selected may correspond to a static data source (e.g., when the user does not wish to include up-to-date data each time the report is generated). Definition module 28 may query calculation engine 25 to determine what data sources currently fall within the category specified by the chosen report option. In the example of FIGS. 4A and 4B, definition module 28 may receive an indication of modified area data element 74. In order to determine which elements must be included in the report specification, definition module 28 may query calculation engine 25. Calculation engine 25 may receive the query or queries and send data indicating the location and/or dimensions of data sources for each province in Canada. In other examples, definition module 28 may not query calculation engine 25. That is, definition module 28 may cause calculation engine 25 to determine a location and/or dimensions of a data element, or may do so itself.

After creating a definition within a report specification, definition module 28 may send an indication of those data elements specified by the definition to UI module 26. UI module 26 may output one or more indications of the specified data elements received from definition module 28 as part of the report generation UI. For instance, in response to receiving data from UI module 26, definition module 28 may create a report specification for creating a report having a definition for columns corresponding to a Canada data element as well as to data elements for each of the individual provinces of Canada. Definition module 28 may send indications of the specified data elements to be included in the report to UI module 26.

As shown in FIG. 4B, UI module 26 may output the indications as part of the revenue report generation UI, GUI 90. GUI 90 may include target containers 72, as well as column headings 92A, 92B, 92C, and 92D (collectively, "column headings 92"). Column headings 92 may be output for display by UI module 26 in response to receiving data from definition module 28. Column heading 92A may correspond to a data element for the province of Ontario, Canada. Column headings 92B and 92C may correspond to data elements for the provinces of Quebec, Canada and New Brunswick, Canada, respectively. Column heading 92D may correspond to a data element for Canada, as a whole. Definition module 28 may cause UI module 26 to display column headings 92 in response to determining a report specification based on user input received in accordance with one or more aspects of the present disclosure. In other words, when UI module 26 receives an indication of user input corresponding to user 12A placing a data element in a target container, UI module 26 may communicate with definition module 28 to create one or more definitions within report specifications, and to output for display a visual representation of those report specifications.

When creating report specifications, a user may desire to include a plurality of data elements in various target containers. For instance, while GUI 90 includes column headings 92 for Canada and its provinces, computing device 16A may allow user 12A to add other data elements to target container 72A, including more columns in the report specification. In some examples, user 12A may add other area data elements to target containers 72B and/or 72C to create more definitions in other areas of the report specification. In other examples, GUI 90 may include other source containers with other types of data elements, such as revenues, sales, expenditures, employees, budgets, or other elements within the multidimensional data. In this manner, UI module 26 may enable a user to create multiple definitions in report specifications for a report, without requiring extensive query language expertise or inefficient selection methods. Techniques of the present disclosure provide the user with an overlay element as part of a GUI, usable to select report options for the desired data elements and create and modify report specifications based on the selected data elements and report options.

Figure 5:
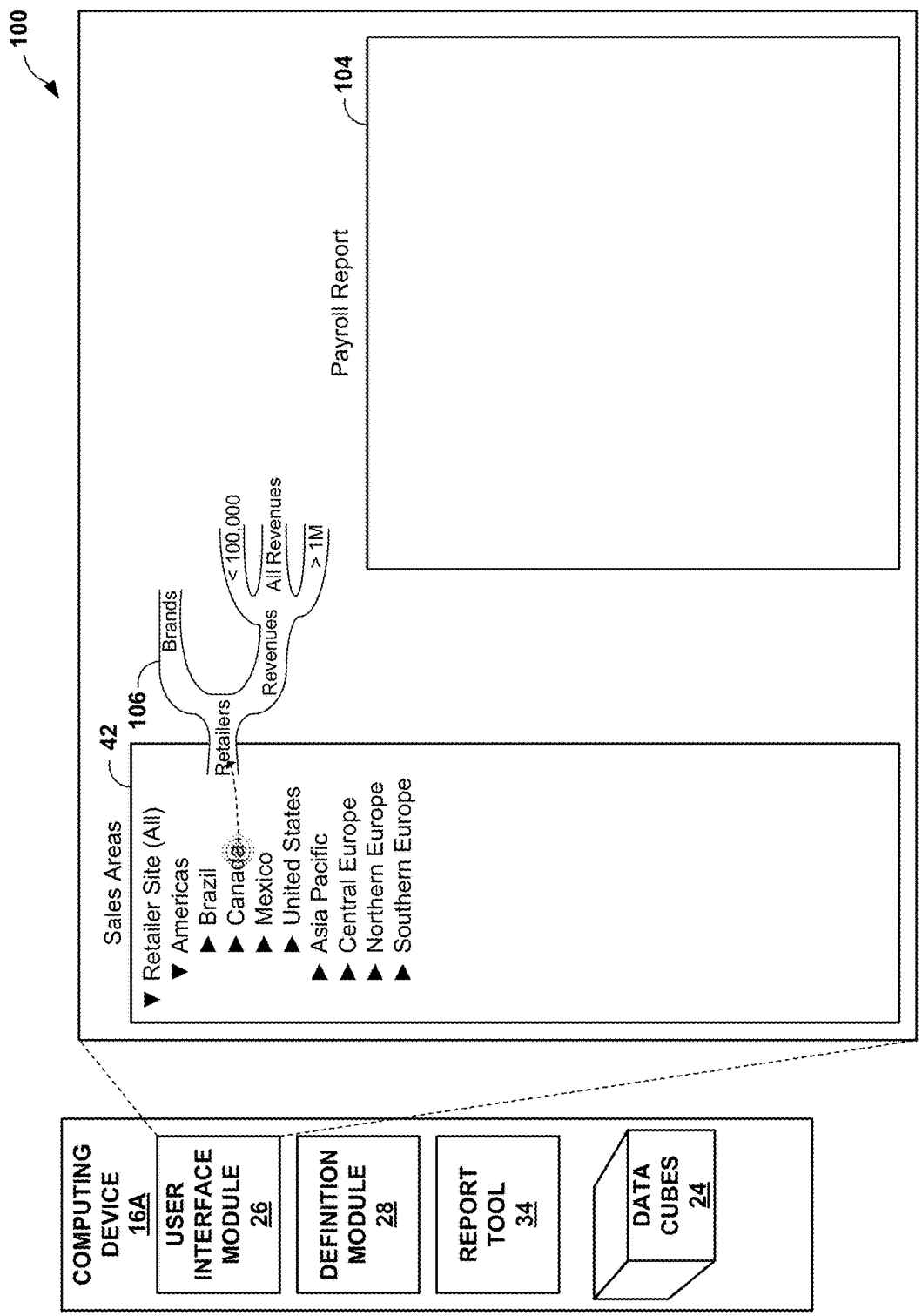
FIG. 5 is a block diagram illustrating an example GUI for providing fine-grained user interaction, in accordance with one or more aspects of the present disclosure.

FIG. 5 is a block diagram illustrating an example GUI for providing fine-grained user interaction, in accordance with one or more aspects of the present disclosure. For purposes of illustration only, the example of FIG. 5 is described below within the context of computing device 16A, as shown in FIGS. 1 and 2. GUI 100 of FIG. 5 may be output for display by, for example, computing device 16A. An overlay element, displayed in accordance with techniques of the present disclosure, may provide user 12A with different report options, depending on the report generation UI in which the overlay element is displayed. In the example of FIG. 5, GUI 100 may, for instance, be a UI usable to generate a payroll report showing payroll costs for various parts of the enterprise. GUI 100 may include source container 42 and target container 104. As shown, user 12A may have selected a sales area titled "Canada" from source container 42, and dragged the data element toward target container 104. In response, UI module 26 may display overlay element 106. The type of report being created (e.g., a payroll report), may determine the report options and associated paths displayed as part of overlay element 106.

Furthermore, overlay elements may enable a user to select successive report options for a particular data element. That is, the overlay element may display paths traversing multiple levels of report options. User 12A may drag a selection through more than one level in order to choose multiple levels of report options and thus create more complex definitions to be included in report specifications. In the example of FIG. 5, GUI 100 displays multi-level overlay element 106, having two available paths to select a first report option (i.e., a path labeled "brands" and a path labeled "revenues"). Overlay element 106 of GUI 100 also contains three sub-paths extending from the "revenues" path, associated with report options to select various revenue ranges. As described above with respect to FIGS. 3A, 3B, a user may traverse a path of an overlay element with a selection to modify the selected data attribute. Upon completing traversal of all levels of the overlay element, the user may place the modified data element in a target container, thereby creating one or more definitions within a report specification. Each level traversed of an overlay element may increase the complexity of a query within a definition to retrieve the relevant data from the proper data sources.

Figure 6:
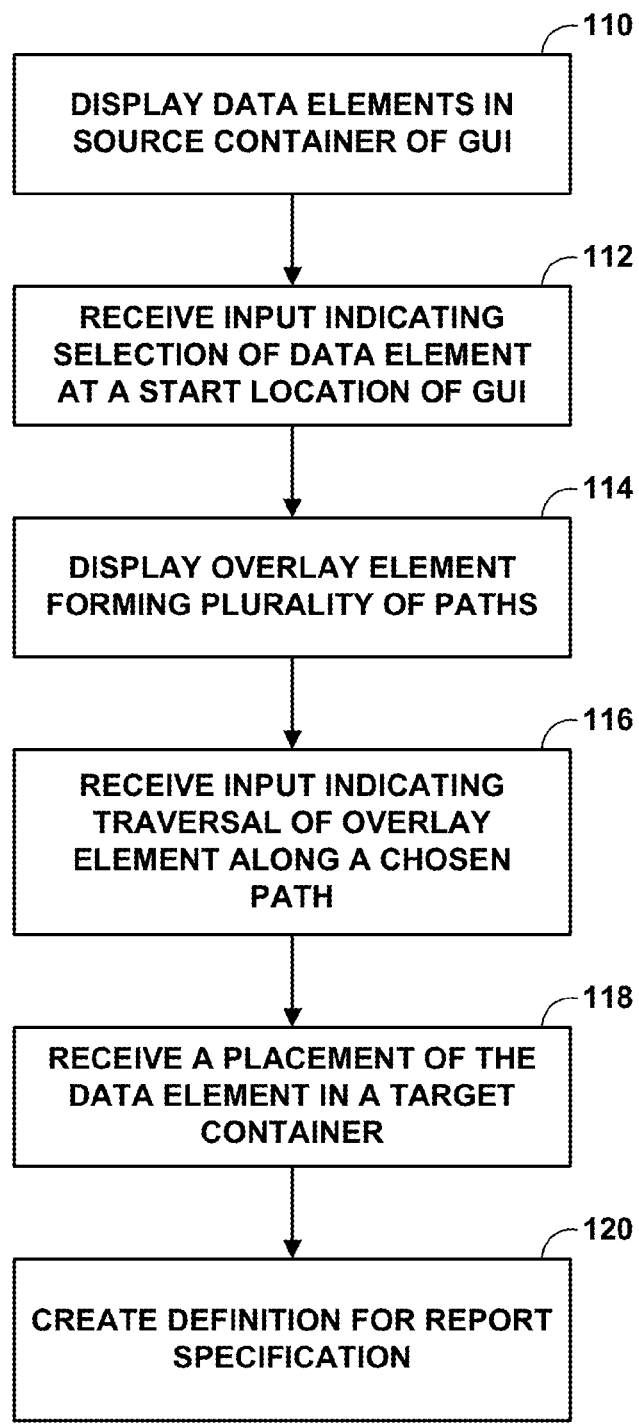
FIG. 6 is a flowchart illustrating an example process that may be used to provide fine-grained user interaction, in accordance with one or more aspects of the present disclosure.

FIG. 6 is a flowchart illustrating an example process that may be used to provide fine-grained user interaction, in accordance with one or more aspects of the present disclosure. For purposes of illustration only, the example process is described below within the context of computing device 16A, as shown in FIGS. 1 and 2.

In the example of FIG. 6, computing device 16A may initially display a GUI for generating a report based on data within enterprise business intelligence system 14. Computing device 16A may display one or more data elements in a source container of the GUI at process step 110. Computing device 16A may receive a selection of a data element at a start location of a GUI, the data element being associated with a plurality of report options at process step 112.

Computing device 16A may display an overlay element having a boundary forming a plurality of paths, corresponding to report options at process step 114. Computing device 16A may receive input indicating a traversal of the overlay element, along a chosen path at process step 116. Computing device 16A may receive a placement of the data element in a target container at process step 118. Computing device 16A may create a definition for a report specification, based at least in part on the report option corresponding to the chosen path at process step 120.

In some examples, the process of FIG. 6 may include, responsive to receiving the second input, modifying the object, based at least in part on the report option corresponding to the chosen path. In some examples, the process may include displaying a visual representation of the data element with the GUI and restricting the visual representation to within the boundary of the overlay element while receiving the inputs. In some examples, the target containers may define a structure of a report.

The process of FIG. 6 may, in some examples, include receiving a third input from the user indicating a movement to a return location of the GUI and computing device 16A may disregard the report option corresponding to the chosen path in response to receiving the third input. In some examples, the report options comprise subsets of the data element. In some examples, the process may include generating a report based at least in part on the created definition, and displaying the report with the GUI. In some examples, the first and second inputs comprise touch inputs.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure.

In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable storage medium encoded with instructions. Instructions embedded or encoded in an article of manufacture including a computer-readable storage medium encoded, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media.

In some examples, a computer-readable storage medium may include a non-transitory medium. The term "non-transitory" may indicate that the storage medium is not embodied in a carrier wave or a propagated signal. In certain examples, a non-transitory storage medium may store data that can, over time, change (e.g., in RAM or cache).

Various aspects of the disclosure have been described. These and other aspects are within the scope of the following claims.

What is claimed is:
1. A method comprising:
receiving, by one or more processing devices, from a user, a first input indicative of a selection of a data cube dimension element defined within a data source, at a start location within a graphical user interface (GUI);
responsive to receiving the selection, displaying, by the one or more processing devices, an overlay element as part of the GUI, the overlay element having a boundary forming a plurality of paths from the start location to a plurality of end locations within the GUI, wherein the plurality of paths correspond to a plurality of report options associated with the data cube dimension element, and the plurality of paths traverses multiple levels of the report options, thereby enabling the user to drag a selection through multiple chosen levels of the report options;
receiving, by the one or more processing devices, from the user, a second input indicative of a traversal of the overlay element along a chosen path from among the plurality of paths, from the start location to one of the end locations corresponding to the chosen path;
modifying, by the one or more processing devices, responsive to receiving the second input and based at least in part on the chosen path, the data cube dimension element in accordance with a report option corresponding to the chosen path; and creating, by the one or more processing devices, a definition for a report specification, based at least in part on the modified data cube dimension element, and based at least in part on the multiple chosen levels of the report options.

2. The method of claim 1, further comprising displaying a visual representation of the data cube dimension element as part of the GUI, and restricting the visual representation to within the boundary of the overlay element while receiving the first and second inputs.

3. The method of claim 1, further comprising displaying a source container as part of the GUI, wherein the start location is located within the source container.

4. The method of claim 1, further comprising displaying one or more target containers as part of the GUI, wherein the one or more target containers define a structure of a report.

5. The method of claim 1, wherein the plurality of report options comprise subsets of the data cube dimension element.

6. The method of claim 1, further comprising:
   receiving, from the user, a third input indicative of a movement to a return location within the GUI; and
   responsive to receiving the third input, disregarding the report option corresponding to the chosen path.

7. The method of claim 1, further comprising generating a report based at least in part on the created definition, and displaying the report as part of the GUI.

8. The method of claim 1, wherein the first and second inputs comprise touch inputs.

9. A computer-implemented method comprising:
   receiving, from a user, a first input for selection of a graphical representation of a data cube dimension object displayed at a start location by a graphical user interface (GUI);
   responsive to receiving the selection, displaying an overlay element by the GUI, the overlay element having a boundary forming a plurality of paths from the start location to a plurality of end locations, wherein the plurality of paths corresponds to a plurality of selectable attributes associated with the data cube dimension object, and the plurality of paths traverses multiple levels of the report options, thereby enabling the user to drag a selection through multiple chosen levels of the report options;
   receiving, from the user, a second input dragging the selected representation along a chosen path from among the plurality of paths, from the start location to one of the end locations corresponding to the chosen path;
   modifying, responsive to receiving the second input, the data cube dimension object based at least in part on the selectable attribute associated with the chosen path; and
   creating a definition for a report specification, based at least in part on the modified data cube dimension element, and based at least in part on the multiple chosen levels of the report options.

10. The computer-implemented method of claim 9, wherein the method further comprises:
    displaying, with the GUI, one or more target containers, wherein the one or more target containers define a structure of a report;
    receiving, from the user, a second input placing the selected representation in a specific target container of the one or more target containers; and
    generating, based at least in part on the data cube dimension object as modified and the specific target container, a report definition.

11. The computer-implemented method of claim 9, wherein the method further comprises:
    displaying, with the GUI, one or more target containers, wherein the one or more target containers are fields of a form;
    receiving, from the user, the second input placing the selected representation in a specific target container of the one or more target containers; and
    populating the field of the specific target container based at least in part on the data cube dimension object as modified.

* * * * *